US010280991B2

(12) United States Patent
Okada et al.

(10) Patent No.: US 10,280,991 B2
(45) Date of Patent: May 7, 2019

(54) DISC BRAKE

(71) Applicants: Mazda Motor Corporation, Hiroshima (JP); HITACHI AUTOMOTIVE SYSTEMS, LTD., Ibaraki (JP)

(72) Inventors: Michiharu Okada, Hiroshima (JP); Shigeyuki Uehara, Hiroshima (JP); Makoto Shida, Atsugi (JP); Jun Watanabe, Yokohama (JP); Shinichi Nakayama, Kofu (JP)

(73) Assignees: MAZDA MOTOR CORPORATION, Hiroshima (JP); HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/538,795

(22) PCT Filed: Dec. 25, 2015

(86) PCT No.: PCT/JP2015/086189
§ 371 (c)(1),
(2) Date: Jun. 22, 2017

(87) PCT Pub. No.: WO2016/104685
PCT Pub. Date: Jun. 30, 2016

(65) Prior Publication Data
US 2017/0343065 A1    Nov. 30, 2017

(30) Foreign Application Priority Data

Dec. 26, 2014   (JP) ................................. 2014-264772

(51) Int. Cl.
*F16D 55/08*    (2006.01)
*F16D 65/18*    (2006.01)
(Continued)

(52) U.S. Cl.
CPC ........... *F16D 55/08* (2013.01); *F16D 55/225* (2013.01); *F16D 65/18* (2013.01); *F16D 65/183* (2013.01);
(Continued)

(58) Field of Classification Search
CPC .......... F16D 55/08; F16D 55/16; F16D 55/30; F16D 55/38; F16D 65/18; F16D 2121/14;
(Continued)

(56) References Cited

U.S. PATENT DOCUMENTS 8,790,208 B2 *   7/2014   Poertzgen ............. B60T 13/741
                                                            475/149
9,145,939 B2 *   9/2015   Giering ............... F16D 65/0006
(Continued)

FOREIGN PATENT DOCUMENTS

DE   102004048700 A1 *   5/2006   ............. B60T 7/107
DE   102012110791 A1 *   5/2014   ............. H02K 5/24
(Continued)

OTHER PUBLICATIONS

EPO translation, DE 10 2004 048 700 A1, May 2006. (Year: 2006).*
(Continued)

*Primary Examiner* — Thomas J Williams
(74) *Attorney, Agent, or Firm* — Wenderoth, Lind & Ponack, L.L.P.

(57) ABSTRACT

An object of the invention is to provide a disc brake improved in reliability.
In a disc brake, a first holder-side projection is formed on a holder, and a first cover-side recess that fits the first holder-side projection of the holder is formed in a cover. An elastic member is disposed between the first holder-side projection of the holder and the first cover-side recess in the cover.

6 Claims, 6 Drawing Sheets

(51) Int. Cl.
*F16D 55/225* (2006.01)
*F16D 121/24* (2012.01)
*F16D 125/50* (2012.01)
*F16D 121/04* (2012.01)
*F16D 123/00* (2012.01)
*F16D 125/38* (2012.01)
*F16D 129/10* (2012.01)

(52) U.S. Cl.
CPC ...... *F16D 2121/04* (2013.01); *F16D 2121/24* (2013.01); *F16D 2123/00* (2013.01); *F16D 2125/38* (2013.01); *F16D 2125/50* (2013.01); *F16D 2129/10* (2013.01)

(58) Field of Classification Search
CPC .. F16D 2121/24; F16D 2129/10; B60T 7/107; B60T 13/74; B60T 13/746
USPC ................................ 188/156, 157, 72.7, 72.8
See application file for complete search history.

(56) References Cited

U.S. PATENT DOCUMENTS

| | | | |
|---|---|---|---|
| 2013/0203554 A1* | 8/2013 | Dettenberger | F16D 65/28 475/343 |
| 2014/0034430 A1 | 2/2014 | Fuse et al. | |
| 2016/0131212 A1 | 5/2016 | Yamasaki et al. | |
| 2016/0186819 A1* | 6/2016 | Zhang | F16D 65/14 188/156 |
| 2016/0200294 A1 | 7/2016 | Takeo | |

FOREIGN PATENT DOCUMENTS

| | | |
|---|---|---|
| JP | 2014-29193 | 2/2014 |
| JP | 2015-1238 | 1/2015 |
| JP | 2015-44424 | 3/2015 |

OTHER PUBLICATIONS

EPO translation, DE 10 2012 110 791 A1, May 2014. (Year: 2014).*
International Search Report dated Feb. 9, 2016 in International Application No. PCT/JP2015/086189.

* cited by examiner

DISC BRAKE

TECHNICAL FIELD

The present invention relates to a disc brake for braking a vehicle.

BACKGROUND ART

Some conventional disc brakes are equipped with a parking disc brake mechanism that operates, for example when the parking brake is activated (see patent literature 1).

CITATION LIST

Patent Literature

Patent Literature 1: JP2014-29193A

SUMMARY OF INVENTION

Technical Problem

Patent literature 1, however, does not take into account vibrations that may occur between a holder supporting internal constituent members and a housing.

An object of the present invention is to provide a disc brake improved in reliability.

Solution to Problem

As a means to solve the problem, one embodiment of the present invention includes a motor supplied with electric current to generate rotary motion, a reduction mechanism accommodated in a housing and configured to utilize the rotary motion generated by the motor to generate amplified force, a cover disposed to cover an opening in an end of the housing, and a holder disposed in the housing to support the motor and the reduction mechanism. The holder has a first projection, and the cover has a first recess that mates with the first projection of the holder. An elastic member is disposed between the first projection of the holder and the first recess in the cover.

The disc brake of the first embodiment of the present invention improves reliability.

DESCRIPTION OF EMBODIMENTS

This embodiment will now be described with reference to FIGS. 1 to 7.

Figure 1:
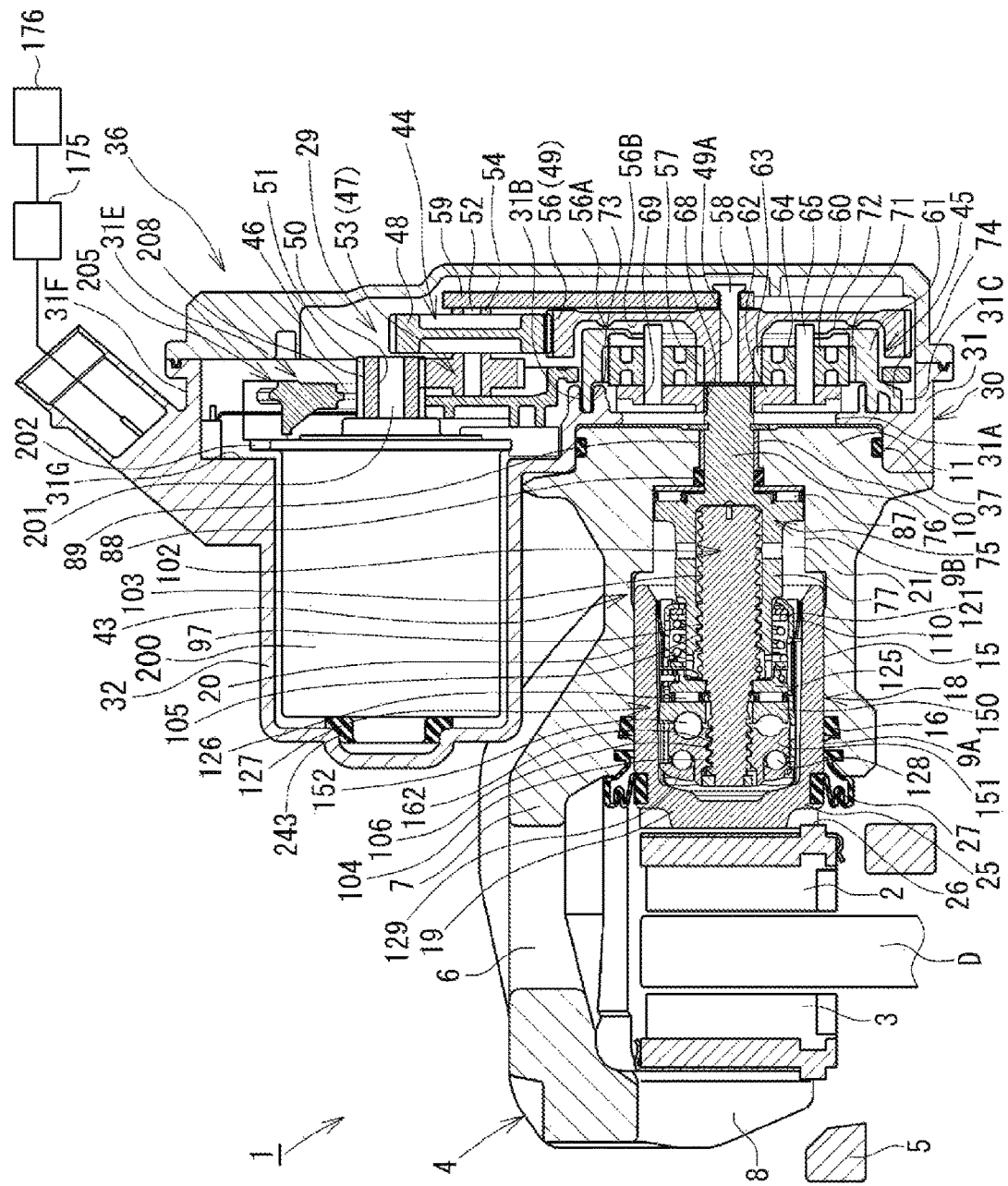
FIG. 1 is a cross-sectional view of the disc brake of the present embodiment.

As shown in FIG. 1, the disc brake 1 includes a pair of an inner brake pad 2 and an outer brake pad 3 on either axial side of a disc rotor D fitted to a rotating part of a vehicle, and a caliper 4. The disc brake 1 is of floating caliper type. The pair of inner and outer brake pads 2 and 3 and the caliper 4 are supported on a bracket 5 fixed to a nonrotating part, such as a knuckle, of the vehicle so that the inner and outer brake pads 2 and 3 and the caliper 4 are movable in the axial direction of the disc rotor D. For convenience of description, the right side of FIGS. 1 and 2 will be referred to as one end side, and the left side as the other end side, where appropriate.

A caliper body 6, the main part of the caliper 4, includes a cylinder member 7 disposed on a proximal side facing the inner brake pad 2 on the inboard side of the vehicle; and a claw portion 8 disposed on a distal side facing the outer brake pad 3 on the outboard side of the vehicle. The cylinder member 7 has a bottomed cylinder 15. The bottomed cylinder 15A has a large-diameter opening 9A in which the inner brake pad 2 side is open. The opposite side from the large-diameter opening 9A is closed by a bottom wall 11 having a hole portion 10. On the bottom wall 11 side of the cylinder 15 is provided a reduced-diameter opening 9B continuously formed with the large-diameter opening 9A. The reduced-diameter opening 9B has a diameter smaller than that of the large-diameter opening 9A. The cylinder 15 has a piston seal 16 on the inner circumferential surface of the large-diameter opening 9A.

Figure 2:
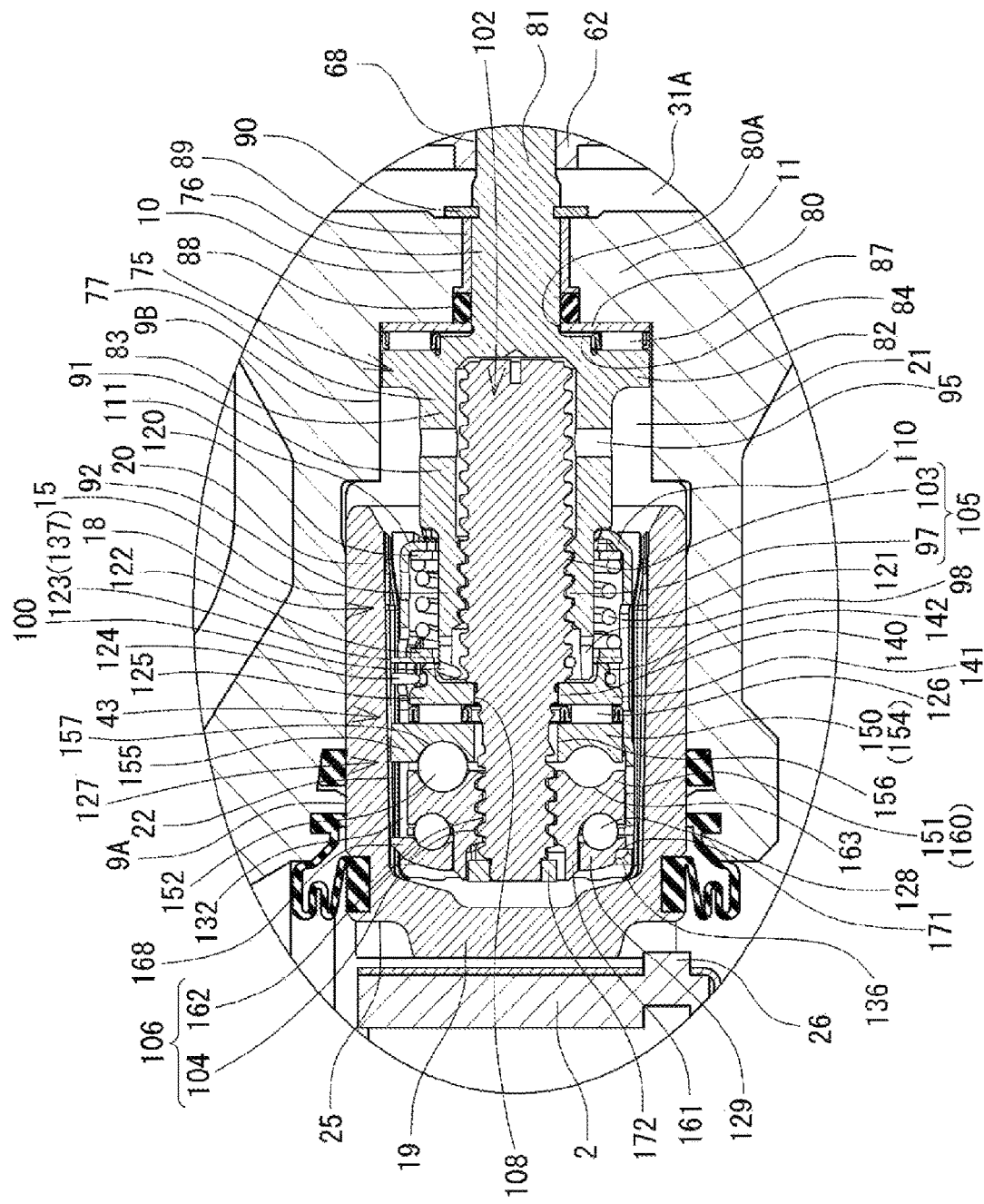
FIG. 2 is an enlarged view of a rotary-to-linear motion converter of the disc brake.

As shown in FIGS. 1 and 2, the piston 18 is of a bottomed cup shape, having a bottom 19 and a cylindrical portion 20. The piston 18 is contained in the cylinder 15 so that the bottom 19 faces the inner brake pad 2. The piston 18 is also provided in the large-diameter opening 9A of the cylinder 15 so that it is axially movable while being in contact with the piston seal 16. A space between the piston 18 and the bottom wall 11 of the cylinder 15 is defined as a hydraulic chamber 21 by the piston seal 16. The hydraulic chamber 21 is supplied with hydraulic pressure from an unillustrated hydraulic pressure source, such as a master cylinder or a hydraulic pressure control unit, via an unillustrated port in the cylinder member 7.

On the inner circumferential surface of the piston 18 are provided longitudinal grooves 22 for rotation restriction, which are a plurality of recesses arranged in a circumferential direction. A recess 25 is provided on an outer circumferential side of the other end surface of the bottom 19 of the piston 18 opposed to the inner brake pad 2. The recess 25 is in engagement with a projection 26 formed on the rear surface of the inner brake pad 2. This engagement prevents the piston 18 from rotating relative to the cylinder 15 and hence the caliper body 6. Between an outer circumferential surface of the bottom 19 of the piston 18 and an inner circumferential surface of the large-diameter opening 9A of the cylinder 15 is provided a dust boot 27 that prevents ingress of foreign matter into the cylinder 15.

On the bottom wall 11 side of the cylinder 15 of the caliper body 6 is fitted a housing 30 in which a motor gear assembly 29 is contained. The housing 30 has an opening 31A at one end thereof. A cover 36 is attached to the opening 31A. The cover closes the opening 31A airtightly. In other words, the opening 30A in the housing 30 is closed by the cover 36. A seal member 37 is provided between the housing 30 and the cylinder member 7. The interior of the housing 30 is kept airtight by the seal member 37. The housing 30 includes a first housing portion 31 accommodating a spur-gear multistage reduction mechanism 44 and a planetary-gear reduction mechanism 45 (described later) so as to cover the outer circumference of the bottom wall 11 of the cylinder 15, and a second housing portion 32 formed in a bottomed cylindrical shape integrally with the first housing portion 31 so as to protrude from the first housing portion 31 and accommodating a motor 200. The housing 30 is thus configured to accommodate the motor 200 in the second housing portion 32 of the bottomed cylindrical shape so that the motor 200 is located side by side with the caliper body 6. The first housing portion 31 includes an outer wall portion 31F and a bottom surface portion 31G that, together with the cover 36, surround an accommodating chamber 31E for accommodating the spur-gear multistage reduction mechanism 44 and the planetary-gear reduction mechanism 45 (described later), a holding aperture 31A for receiving part of the bottom wall 11 of the cylinder 15 in such a manner that a polygonal shaft portion 81 of a base nut 75 of the rotary-to-linear motion converter 43 (described later) extends through the holding aperture 31A, an inner annular wall portion 31B projecting around the holding aperture 31A; an outer annular wall portion 31C projecting and spaced radially outward from the inner annular wall portion 31B; and a plurality of engaging grooves 31D located at intervals in the circumferential direction of the outer annular wall portion 31C.

The caliper body 6 is provided with the rotary-to-linear motion converter 43 for propelling the piston 18 and holding the propelled piston 18 in its braking position, and the spur-gear multistage reduction mechanism 44 and the planetary-gear reduction mechanism 45 for amplifying drive force provided by the motor 200. The spur-gear multistage reduction mechanism 44 and the planetary-gear reduction mechanism 45, serving as a speed reduction mechanism, are housed in the chamber 31E inside the first housing portion 31 of the housing 30.

The rotary-to-linear motion converter 43 converts rotary motion transmitted from the spur-gear multistage reduction mechanism 44 and the planetary-gear reduction mechanism 45, that is, rotation of the motor 200 to straight-line motion (hereinafter "linear motion" for brevity) and imparts thrust to the piston 18 and holds it in its braking position. The rotary-to-linear motion converter 43 includes a base nut 75 rotatably supported and adapted to receive the rotary motion transmitted from the spur-gear multistage reduction mechanism 44 and the planetary-gear reduction mechanism 45, a pushrod 102 screwed in a female thread 97 of the base nut 72 and supported to rotate and move linearly, and a ball-and-ramp mechanism 127 engaged via threads with the pushrod 102 to utilize the rotation of the pushrod 102 to impart axial thrust to the piston 18. The rotary-to-linear motion converter 43 is housed between the cylinder 15 and the piston 18 in the caliper body 6.

Figure 3:
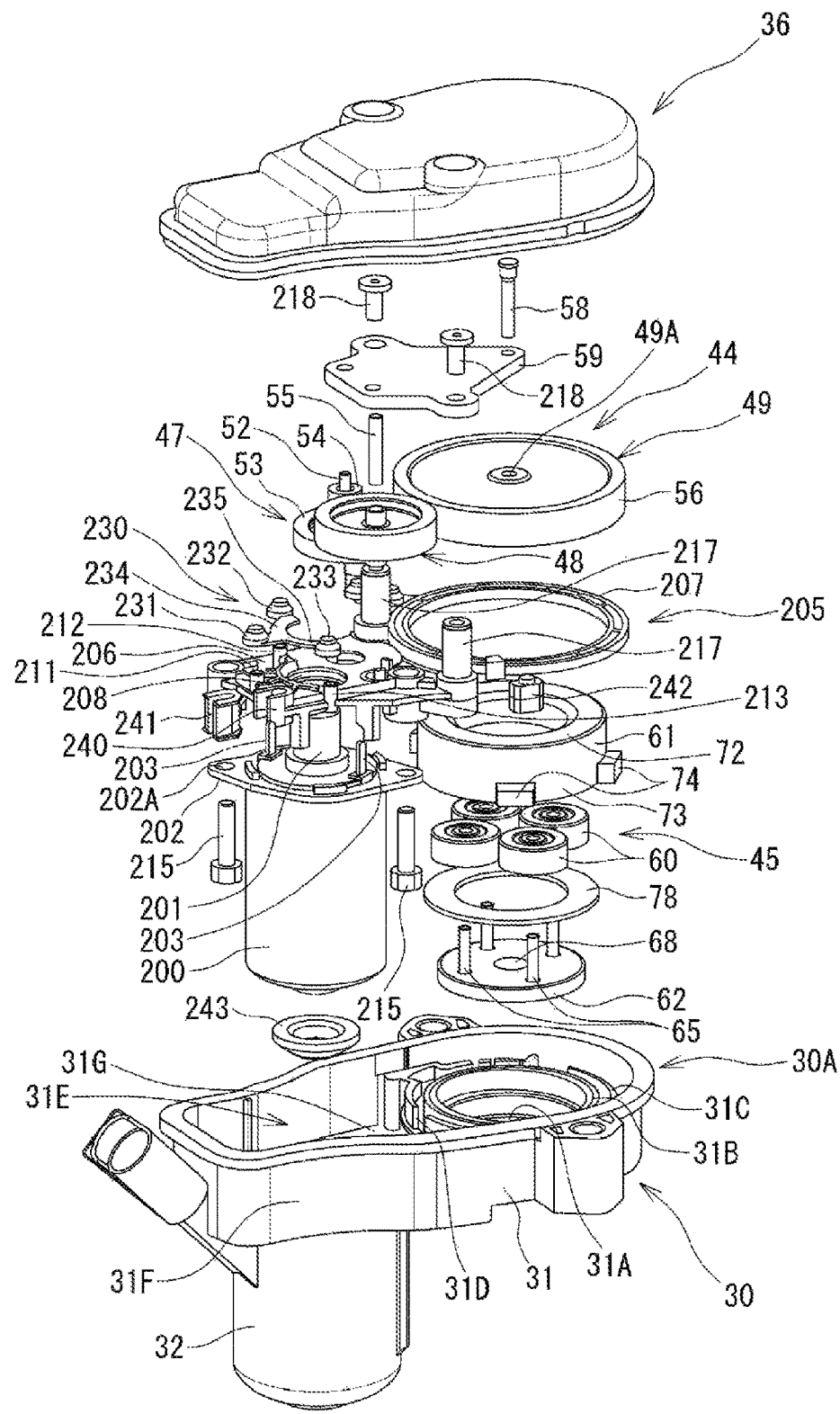
FIG. 3 is an exploded perspective view of the disc brake.

As shown in FIGS. 1 and 3, the spur-gear multistage reduction mechanism 44 includes a pinion gear 46, a first reduction gear 47, a non-reduction spur gear 48, and a second reduction gear 49. The first reduction gear 47, the non-reduction spur gear 48, and the second reduction gear 49 are made of a metal or a resin, such as a fiber-reinforced resin.

The pinion gear 46 is cylindrical in shape and includes a hole portion 50 fixedly press-fitted with a rotating shaft 201 of the motor 200, and a gear 51 formed on the outer circumference of the pinion gear 46. The first reduction gear 47 includes a large gear 53 having a larger diameter and meshing with the gear 51 of the pinion gear 46, and a small gear 54 having a smaller diameter and axially projecting from the large gear 53. The large gear 53 and the small gear 54 are formed integrally. The first reduction gear 47 is supported on a shaft 52 so as to rotate relative to a support plate 59 and a holder 205 (described later). The shaft 52 is supported at one end by a support plate 59 adjacent to the cover 36 and at the other end by the holder 205.

The small gear 54 of the first reduction gear 47 is meshed with the non-reduction spur gear 48. The non-reduction spur gear 48 is supported on the shaft 55 so as to rotate relative to the support plate 59 and the holder 205. The shaft 55 is supported at one end by the support plate 59 adjacent to the cover 36 and at the other end by the holder 205. The second reduction gear 49 includes a large gear 56 having a larger diameter and meshing with the non-reduction spur gear 48, and a sun gear 57 having a smaller diameter and axially projecting from the large gear 56. The large gear 56 and the sun gear 57 are formed integrally. The sun gear 57 is part of the planetary-gear reduction mechanism 45 (described later). The second reduction gear 49 has a hole 49A at its center, through which the shaft 58 extends. The shaft 58 has one end fixedly press-fitted in the support plate 59 adjacent to the cover 36. The second reduction gear 49 is rotatably supported on the shaft 58. The large gear 56 of the second reduction gear 49 has an annular wall portion. The annular wall portion includes an annular stopper portion 56A projecting toward the planetary-gear reduction mechanism 45 side.

The planetary-gear reduction mechanism 45 includes the sun gear 57 of the second reduction gear 49, a plurality of planetary gears 60 (four in this embodiment), an internal gear 61, and a carrier 62. Each planetary gear 60 and the internal gear 61 may be made of, but not particularly limited to, a resin containing electrically nonconductive glass fiber, so as to serve as an insulator when it is necessary to prevent ground fault, i.e., leakage of electrical current from the motor 200 to the caliper 4. Each planetary gear 60 includes a gear 63 meshing with the sun gear 57 of the second reduction gear 49, and a hole portion 64 through which a pin 65, projecting from the carrier 62, extends rotatably. The planetary gears 60 are located at equal intervals along the circumference of the carrier 62.

The carrier 62 is disc-shaped with a polygonal hole 68 at generally its radial center. The carrier 62 has an outer diameter approximately the same as the outer diameter of a trajectory along which each planetary gear 60 revolves. The carrier 62 has a plurality of pin hole portions 69 at equal circumferential intervals along the outer circumference side thereof. A pin 65 is fixedly press-fitted in each pin hole portion 69. The each pin 65 is rotatably inserted in each hole portion 64 in the planetary gears 60. The polygonal hole 68 in the carrier 62 and the polygonal shaft portion 81 of the base nut 75 of the rotary-to-linear motion converter 43 (described later) are fitted together to transmit rotational torque mutually between the carrier 62 and the base nut 75. An annular support member 78 is provided between the carrier 62 and each planetary gear 60.

The internal gear 61 includes internal teeth 71 meshed with the gears 63 of the planetary gears 60, an annular wall portion 72 radially extending continuously from an end of the inner teeth 71 on the cover 36 side to restrict axial movement of the planetary gears 60, and a tubular wall portion 73 extending from the inner teeth 71 toward the bottom wall 11 of the cylinder 15 and inserted in an annular space between the inner annular wall portion 31B and the outer annular wall portion 31C of the first housing portion 31. The internal gear 61 has a plurality of projections 74 on the outer circumferential surface thereof. The projections 74 are located at circumferential intervals. The projections 74 project outward and are engaged in the respective engaging grooves 31D in the first housing portion 31. The pins 65 are located inside the annular wall portion 72 of the internal gear

61. Each pin 65 projects slightly beyond the annular wall portion 72 toward the cover 36. The projections 74 of the internal gear 61 are inserted and engaged in the respective engaging grooves 31D in the first housing portion 31, and thus the internal gear 61 is non-rotatably supported in the first housing portion 31. The internal gear 61 is supported in the first housing portion 31 in such a manner that it is prevented from moving axially since the annular stopper portion 56A of the large gear 56 of the second reduction gear 49 is located on the cover 36 side of the annular wall portion 72 of the internal gear 61.

Figure 4:
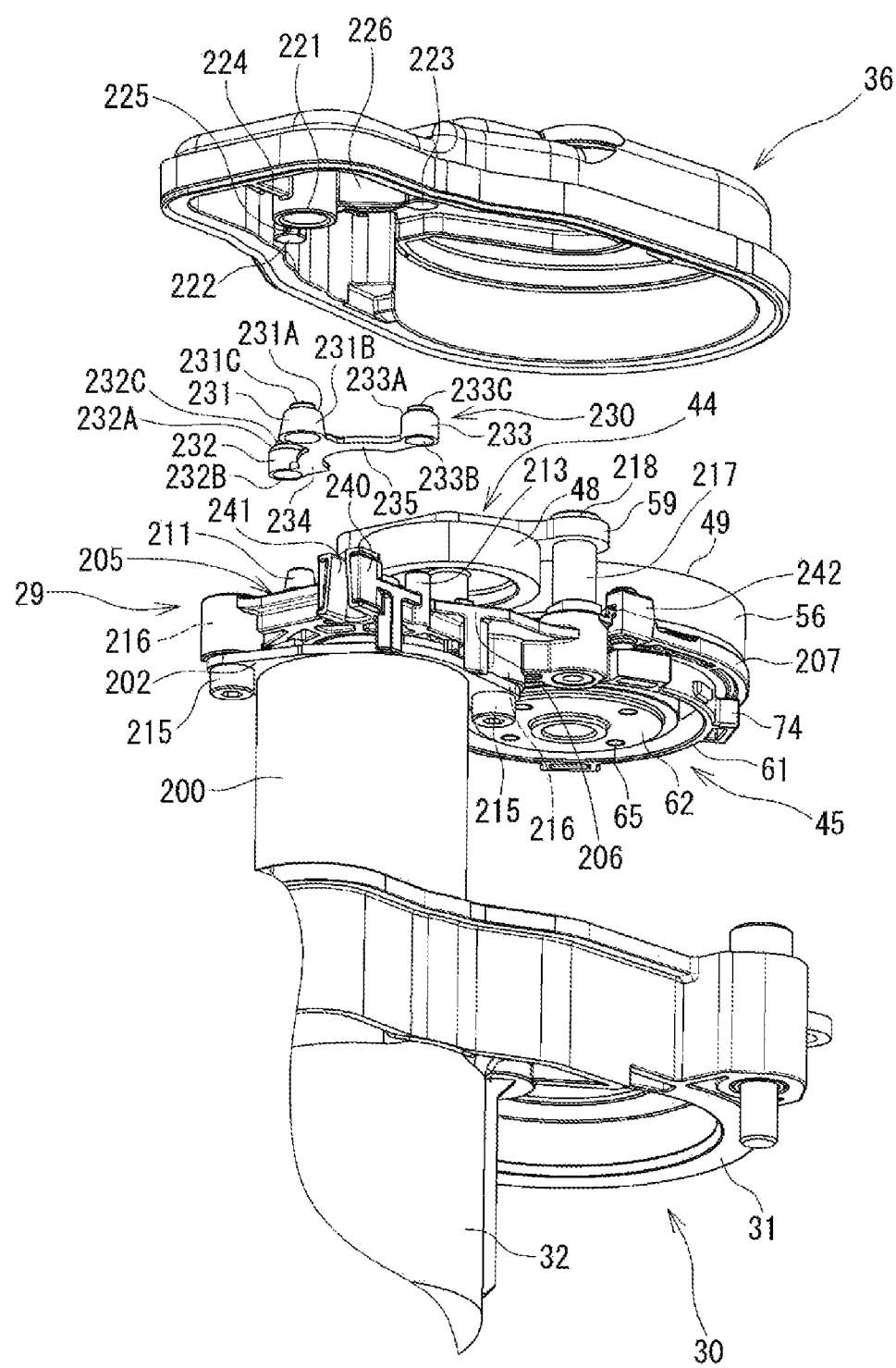
FIG. 4 is another exploded perspective view of the disc brake.

As shown in FIGS. 3 and 4, the motor 200 is supported by the holder 205 placed on a flange portion 202 of the motor 200. The holder 205 includes a motor support 206 and a ring-like support 207 that are integrally connected. The motor support 206 is located between the first reduction gear 47 and the non-reduction spur gear 48, and the flange portion 202 of the motor 202, so as to support the motor 200. The ring-like support 207 is disposed around the internal gear 61 of the planetary-gear reduction mechanism 45 so as to surround the internal gear 61. The motor support 206 is provided with a rotary-shaft insertion aperture 208, in which the pinion gear 46 fixedly press-fitted on the rotary shaft 201 of the motor 200 is inserted. Around the rotary-shaft insertion aperture 208 are provided two terminal insertion apertures win which motor terminals 203 of the motor 200 are inserted. A pair of terminal insertion apertures are located on diametrically opposite sides of the rotary-shaft insertion aperture 208.

Figure 5:
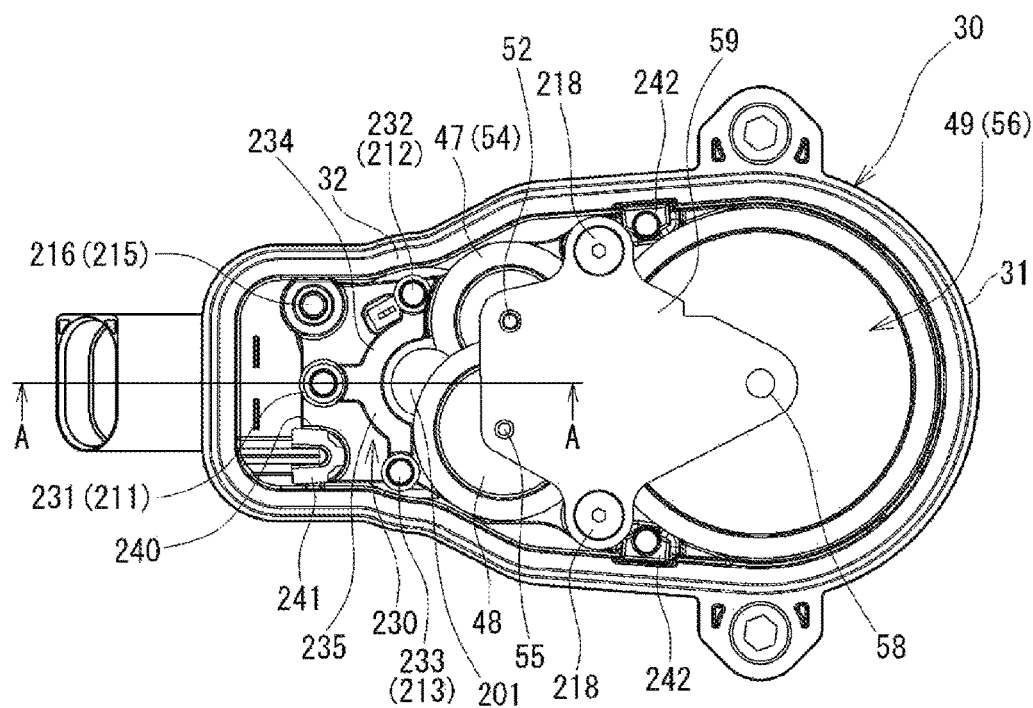
FIG. 5 is a plan view of the interior of the housing in the disc brake.

As shown in FIGS. 3 to 5, the motor support 206 of the holder 205 is provided with a first holder-side projection 211, a second holder-side projection 212, and a third holder-side projection 213 that are spaced apart around the rotary-shaft insertion aperture 208 and are located on an opposite side to the planetary-gear reduction mechanism 45. The first to third holder-side projections 211 to 213 are cylindrical and protrude toward the cover 36. The first holder-side projection 211 is disposed close to the rotary shaft 201 of the motor 200. More specifically, the first holder-side projection 211 lies on the line connecting the radial center of the rotary shaft 201 of the motor 200 and the radial center of the sun gear 57 of the planetary-gear reduction mechanism 45 and on the side opposite to the planetary-gear reduction mechanism 45 with respect to the rotary shaft 201 of the motor 200. The second holder-side projection 212 is located on the first reduction gear 47 side, and the third holder-side projection 213 on the non-reduction spur gear 48 side. The motor support 206 is provided with two fastening apertures 216. Mounting bolts 215 are fastened via through-holes 202A in the flange portion 202 of the motor 200 into the fastening apertures 216 in the motor support 206 to support the motor 200 on the holder 205. The ring-like support 207 sits on the projections 74 so as to be in contact with the outer circumferential surface of the internal gear 61 of the planetary-gear reduction mechanism 45 and.

As shown in FIG. 3, the holder 205 is integrally formed with two cylindrical supports 217 and 217 that are spaced apart and located between the motor support 206 and the ring-like support 207. The support plate 59 is supported above the holder 205, with a space therebetween, by placing the support plate 59 on the cylindrical supports 217 and tightening mounting bolts 218 through the support plate 59 into the cylindrical supports 217 of the holder 205.

Figure 6:
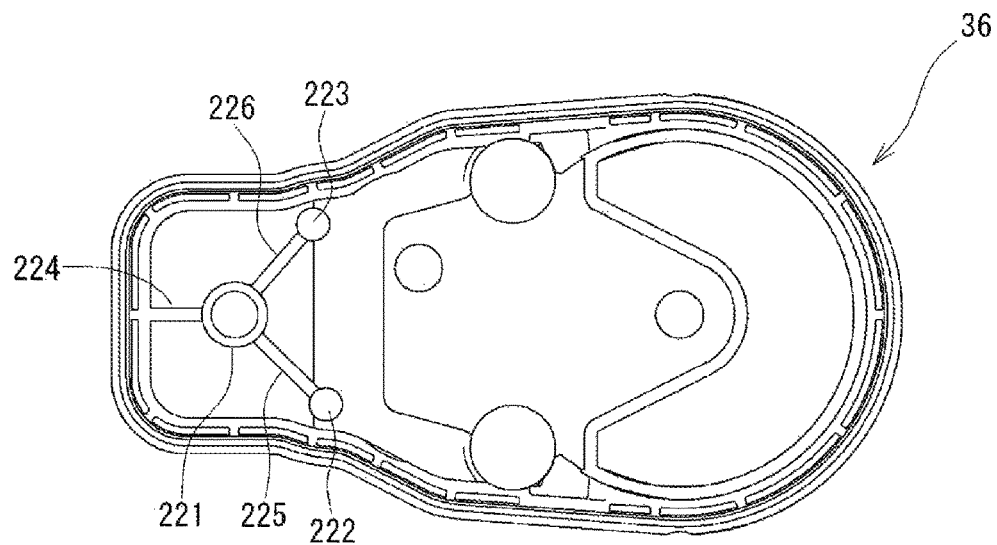
FIG. 6 is a bottom view of the cover of the disc brake.

As can be seen from FIGS. 4 and 6, the cover 36 is provided, on its inner side, with a first cover-side cylindrical portion 221, which is a first recess, and a second cover-side projection 222 and a third cover-side projection 223. The first to third cover-side projections 221 to 223 extend in a vertical direction. The first cover-side cylindrical portion 221 and the second and third cover-side projections 222 and 223 are located at opposite positions to the first to third holder-side projections 211 to 213 of the holder 205, respectively. The first cover-side cylindrical portion 211 and a circumferential wall portion of the cover 36 are connected by a first rib 224, and the first cover-side cylindrical portion 221 and the second cover-side projection 222 by a second rib 225. The first cover-side cylindrical portion 221 and the third cover-side projection 223 are connected by a third rib 226. A rubber 230, which is an elastic member, is provided between the first cover-side cylindrical portion 221 and the second and third cover-side projections 222 and 223 of the cover 36, and the first to third holder-side projections 211 to 223 of the holder 205.

As shown in FIGS. 3 to 5, the rubber 230 includes a first cup portion 231, a second cup portion 232, and a third cup portion 233 that are integrally connected. As shown in FIG. 4, the first cup portion 231 includes a circular first top end portion 231A and a first cylindrical portion 231B that is integral with and descends from the first top end portion 231A. A first protrusion 231C stands on one surface of the first top end portion 231A of the first cup portion 231. The first protrusion 231C is formed into a disc-like shape having a smaller diameter than the first top end portion 231A. The second cup portion 232 also includes a circular second top end portion 232A and a second cylindrical portion 232B that is integral with and descends from the second top end portion 232A. A second protrusion 232C stands on one surface of the second top end portion 232A of the second cup portion 232. The second protrusion 232C is formed into a disc-like shape having a smaller diameter than the second top end portion 232A. The third cup portion 233 also includes a circular third top end portion 233A and a third cylindrical portion 233B that is integral with and descends from the third top end portion 233A. A third protrusion 233C stands on one surface of the third top end portion 233A of the third cup portion 233. The third protrusion 233C is formed into a disc-like shape having a smaller diameter than the third top end portion 233A. As shown in FIGS. 3 to 5, the first cylindrical portion 231B of the first cup portion 231 and the second cylindrical portion 232B of the second cup portion 232 are integrally connected by a first arm portion 234. The first cylindrical portion 231B of the first cup portion 231 and the third cylindrical portion 233B of the third cup portion 233 are integrally connected by a second arm portion 235.

Figure 7:
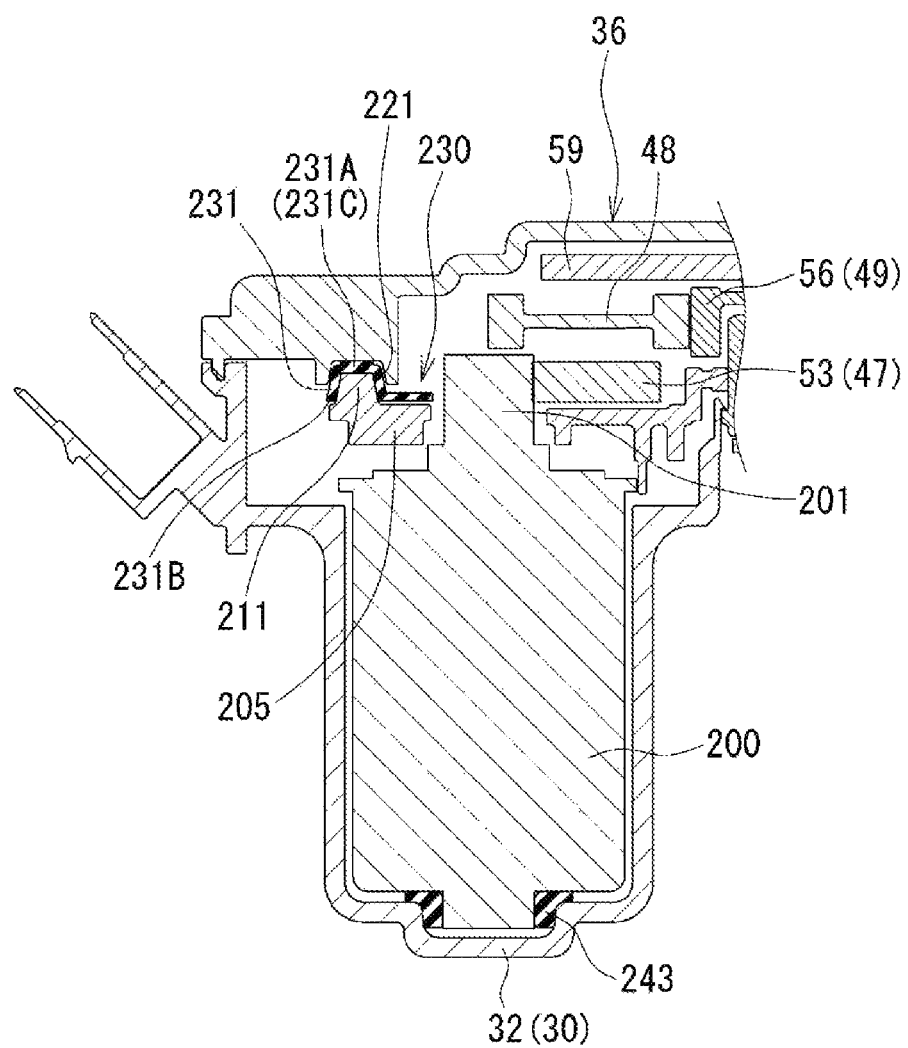
FIG. 7 is a cross-sectional view taken along line A-A of FIG. 5.

The first cylindrical portion 231B of the first cup portion 231 of the rubber 230 is fitted on the first holder-side projection 211 of the holder 205, the second cylindrical portion 232B of the second cup portion 232 of the rubber 230 on the second holder-side projection 212 of the holder 205, and the third cylindrical portion 233B of the third cup portion 233 of the rubber 230 on the third holder-side projection 213 of the holder 205. Also, the first cylindrical portion 231B, including the first protrusion 231C of the first cup portion 231 of the rubber 230, is fitted in the first cover-side cylindrical portion 221 of the cover 36 (see FIG. 7), and the second protrusion 232C of the second cup portion 232 of the rubber 230 is brought into contact with the second cover-side projection 222 of the cover 36, and the third protrusion 233C of the third cup portion 233 of the rubber 230 into the third cover-side projection 223 of the cover 36. The rubber 230 is unitized with the holder 205 while the first cylindrical portion 231B of the first cup portion 231 of the rubber 230 is fitted on the first holder-side projection 211 of the holder 205 and the second cylindrical portion 232B of the second cup portion 232 is fitted on the second holder-side projection 212 of the holder 205 and the third cylindrical portion 233B of the third cup portion 233 is fitted on the third holder-side projection 213 of the holder 205. As shown in FIG. 7, an opening end side of the first cylindrical portion 231B of the first cup portion 231 is formed so as to extend beyond the first cover-side cylindrical portion 221 of the cover 36, thereby preventing contact between the first holder-side projection 211 and the first cover-side cylindrical portion 221. In other words, the first cup portion 231, an elastic member, is cup-shaped with the opening end side thereof extending beyond the first cover-side cylindrical portion 221.

As shown in FIG. 3, in the present embodiment, rubbers 241 to 243 of different types, other than the rubber 230 is provided in the housing 30. The holder 205 has a support 240 of U-shaped cross section at its end on the motor 200 side. The support 240 is disposed integrally with the rubber 241 of U-shaped cross section in the support 240. Each block-shaped rubber 242 is located between a position, near each cylindrical support 217, on the outer circumferential surface of the ring-like support 207 of the holder 205 and the first housing portion 31. The cylindrical rubber 243 is located between an end of the motor 200 and the second housing portion 32.

The motor 200, the spur-gear multistage reduction mechanism 44, the planetary-gear reduction mechanism 45, and rubbers 230 and 241 to 243 are assembled with the holder 205 and the support plate 59, as described above, to form the motor gear assembly 29. The motor gear assembly 29 is suspended by the rubbers 230 and 241 to 243 in a so-called floating state in relation to the housing 30 and the cover 36. That is to say, the motor gear assembly 29 is secured via the rubbers 230 and 241 to 243 to the housing 30 and the cover 31 without contact between the holder 205 and the housing 30 or the cover 36. The motor gear assembly 29, thus secured via the rubbers 230 and 241 to 243 to the housing 30 and the cover 36, prevents or reduces transmission of vibrations to the housing 30 and the cover 36 caused by the motor 200, the spur-gear multistage reduction mechanism 44, and the planetary-gear reduction mechanism 45, thereby preventing or reducing generation of noise caused by the vibrations.

This embodiment uses the spur-gear multistage reduction mechanism 44 and the planetary-gear reduction mechanism 45 as a reduction mechanism for amplifying the drive force generated by the motor 200, so as to provide torque for propelling the piston 25. For such purpose, however, the planetary-gear reduction mechanism 45 may be used alone. Alternatively, a known reducer, such as a cycloid reduction mechanism or a harmonic gear reducer, may be combined with the planetary-gear reduction mechanism 45.

As shown in FIGS. 1 and 2, the base nut 75 includes a cylindrical portion 76, and a nut portion 77 integral with the other end of the cylindrical portion 76. A washer 80 is provided in abutment with the bottom wall 11 of the cylinder 15. The cylindrical portion 76 of the base nut 75 is inserted in a through-hole 80A in the washer 80 and the hole portion 10 of the bottom wall 11 of the cylinder 15. The distal end of the cylindrical portion 76 is integrally connected to the polygonal shaft portion 81. The polygonal shaft portion 81 is penetrated through the opening 31A in the first housing portion 31 and fitted in the polygonal hole 68 in the carrier 62. The nut portion 77 of the base nut 75 is cylindrical in shape with a bottom. The nut portion 77 includes a circular wall portion 82, and a cylindrical portion 83 integral with and projecting from the other end of the circular wall portion 82. The circular wall portion 82 has an outer circumferential surface close to an inner wall surface of the reduced-diameter opening portion 9B of the cylinder 15. A small-diameter circular wall portion 84 projects from a radially central portion of one end surface of the circular wall portion 82. The cylindrical portion 76 projects from one end surface of the small-diameter circular wall portion 84 toward the one end side. The cylindrical portion 76 has an outer diameter smaller than that of the cylindrical portion 83 of the nut portion 77.

A thrust bearing 87 is disposed between the circular wall portion 82 around the small-diameter circular wall portion 84 of the nut portion 77 of the base nut 75, and the washer 80. The base nut 75 is rotatably supported on the bottom wall 11 of the cylinder 15 by the thrust bearing 87. A seal member 88 and a sleeve 89 are provided between the outer circumferential surface of the cylindrical portion 76 of the base nut 75 and the hole portion 10 of the bottom wall 11 of the cylinder 15. This keeps the hydraulic chamber 21 liquid-tight. A stopper ring 90 is fitted in an annular groove between the cylindrical portion 76 of the base nut 75 and the polygonal shaft portion 81. The stopper ring 90 restricts axial movement of the cylinder 15 of the base nut 75.

The cylindrical portion 83 of the nut portion 77 of the base nut 75 includes a large-diameter cylindrical portion 91 at one end and a small-diameter cylindrical portion 92 at the other end. An end of the large-diameter cylindrical portion 91 is integrally connected to the circular wall portion 82. The large-diameter cylindrical portion 91 has a circumferential wall with a plurality of radially extending through-holes 95. The plurality of through-holes 95 are disposed circumferentially at intervals. The small-diameter cylindrical portion 92 of the nut portion 77 has an inner circumferential surface with a female thread portion 97. The small-diameter cylindrical portion 92 has a circumferential wall with a plurality of locking grooves 98 on the other end surface. The locking grooves 98 are circumferentially spaced apart. In this embodiment, there are four locking grooves 98.

As shown in FIG. 2, a tip portion of a first spring clutch 100 is fitted in any of the locking grooves 98 in the small-diameter cylindrical portion 92 of the base nut 75. The first spring clutch 100 imparts rotational resistance to rotation in one direction. The first spring clutch 100 includes a single turn of coil portion that continues from the tip portion pointing radially outward. The tip portion of the first spring clutch 100 is fitted in any of the locking grooves 98 in the small-diameter cylindrical portion 92 of the base nut 75, and the coil portion is wound around the outer circumference, on the other end side, of a male thread portion 103 of the pushrod 102 (described later). The first spring clutch 100 applies rotation-resistant torque in a rotational direction when the pushrod 102 moves relative to the base nut 75 toward the bottom wall 11 of the cylinder 15 (rotational direction for release), while permitting rotation in another rotational direction when the pushrod 102 moves relative to the base nut 75 toward the bottom 19 of the piston 18 (rotational direction for apply).

One end side of the pushrod 102 is inserted in the nut portion 77 of the base nut 75. The pushrod 102 has a male thread portion 103 on the one end side that is threadably fitted in the female thread portion 97 of the small-diameter cylindrical portion 92 of the base nut 75. Between the male thread portion 103 of the pushrod 102 and the female thread portion 97 of the small-diameter cylindrical portion 92 of the base nut 75, there is a first thread fitting portion 105 that has a reverse efficiency of zero or less to prevent rotation of the base nut 75 that would otherwise be caused by axial load from the piston 18 acting on the pushrod 102. In other words, the first thread fitting portion 105 is a thread fitting portion having a good irreversibility.

On the other hand, the other end side of the pushrod 102 is provided a male thread portion 104 that is threadably fitted in a female thread portion 162 on a rotary-to-linear motion ramp 151 of a ball-and-ramp mechanism 127 (described later). Between the male thread portion 104 of the pushrod 102 and the female thread portion 162 of the rotary-to-liner motion ramp 151, there is also a second thread fitting portion 106 that has a reverse efficiency of zero or less to prevent rotation of the pushrod 102 that would otherwise be caused by axial load from the piston 18 acting on the rotary-to-linear motion ramp 151. In other words, the second thread fitting portion 106 is a thread fitting portion having a good irreversibility.

The pushrod 102 has a spline shaft 108 between the male thread portion 103 on the one end side and the male thread portion 104 on the other end side. The male thread portion 103 on the one end side has an outer diameter larger than that of the male thread portion 104 on the other end side. The male thread portion 103 on the one end side has an outer diameter larger than that of the spline shaft 108. The other end surface of the male thread portion 104 of the pushrod 102 is opposed to the bottom 19 of the piston 18.

A retainer 110 is axially-movably supported between the outer circumferential surface of the small-diameter cylindrical portion 92 of the cylindrical portion 84, which is part of the nut portion 77 of the base nut 75, and the inner circumferential surface of the cylindrical portion 20 of the piston 18. The retainer 110 has an annular wall portion 111 on the one end side, and generally cylindrical as a whole. The retainer 110 has a plurality of through-holes in its outer circumferential wall.

In the retainer 110, a one-end-side washer 120, a coil spring 121, an other-end-side washer 122, a support plate 123, a second spring clutch 124, a rotary member 125, a thrust bearing 126, a ball-and-ramp mechanism 127, a thrust bearing 128, and an annular compression plate 129 are arranged in this order from the one end side. The one-end-side washer 123 is brought into contact with the other end face of the annular wall portion 111 of the retainer 110.

The coil spring 121 is disposed between the one-end-side washer 120 and the other-end-side washer 122. The coil spring 121 is biased in a direction in which the one-end-side washer 120 and the other-end-side washer 122 are spaced apart from each other. The retainer 110 has a plurality of circumferentially spaced apart locking grooves 132 of certain depth on the other end surface of a circumferential wall portion of the retainer 110. In this embodiment, there are three locking grooves 132. The retainer 110 has a plurality of lugs 136 at the other end. The lugs 136 extend toward the bottom 19 of the piston 18. After the one-end-side washer 120, coil spring 121, the other-end-side washer 122, the support plate 123, the second spring clutch 124, the rotary member 125, the thrust bearing 126, the ball-and-ramp mechanism 127, the thrust bearing 128, and the annular compression plate 129 are contained in the retainer 110, each lug 136 of the retainer 110 are folded toward a receiving recess 171 (described later) in the annular compression plate 129, thereby enabling the constituent members described above to be integrally arranged in the retainer 110 to form an assembly.

The support plate 123, which is annular, is abutted on the other end surface of the other-end-side washer 122. The support plate 123 has a plurality of projections 137 on its outer circumferential surface. The projections 137 are circumferentially spaced apart. In this embodiment, there are three projections 137. The projections 137 of the support plate 123 are fitted in the locking grooves 132 in the retainer 110 and the longitudinal grooves 22 for rotation restriction in the inner circumferential surface of the piston 18, respectively. As a result, the retainer 110, together with the one-end-side washer 120, the coil spring 121, the other-end-side washer 122, and the support plate 123, is supported so as not to rotate relative to the piston 18, while permitting axial movement relative to it.

In the retainer 110, the rotary member 125 is rotatably supported on the other end side of the support plate 123. The rotary member 125 includes a large-diameter annular portion 141 having a spline hole 140, and a small-diameter cylindrical portion 142 projecting integrally from one end surface of the large-diameter annular portion 141. One end of the small-diameter cylindrical portion 142 is abutted on the other end surface of the support plate 123. The pushrod 102 is inserted in the rotary member 125 so that the spline hole 140 of the large-diameter annular portion 141 of the rotary member 125 is spline-coupled to a spline shaft 108 of the pushrod 102. This enables the rotary member 125 and the pushrod 102 to transmit rotational torque mutually.

The second spring clutch 124 is wound around the outer circumferential surface of the small-diameter cylindrical portion 142 of the rotary member 125. The second spring clutch 124 imparts rotational resistance to rotation in one direction. Similarly to the first spring clutch 100, the second spring clutch 124 includes a single turn of coil portion that continues from its tip portion pointing radially outward. The tip portion of the second spring clutch 124 is fitted in any of the locking grooves 132 in the retainer 110, and the coil portion is wound around the outer circumferential surface of the small-diameter cylindrical portion 142 of the rotary member 125. The second spring clutch 124 applies rotation-resistant torque in a rotational direction when the rotary member 125 (pushrod 102) moves relative to the retainer 110 toward the bottom 19 of the piston 18 (rotational direction for apply), while permitting rotation in another rotational direction when the rotary member 125 (pushrod 102) moves toward the bottom wall 11 of the cylinder 15 (rotational direction for release).

The rotation-resistant torque applied by the second spring clutch 124 at the time of apply is set greater than that acting at the first thread fitting portion 105 between the male thread portion 103 of the pushrod 102 and the female thread portion 97 of the base nut 75. The ball-and-ramp mechanism 127 is disposed on the other end side of the rotary member 125 via the thrust bearing 126. The rotary bearing 125 is rotatably supported via the thrust bearing 126 on the ball-and-ramp mechanism 127.

The ball-and-ramp mechanism 127 includes a fixed ramp 150, a rotary-to-linear motion ramp 151, and balls 152 interposed between the fixed ramp 150 and the rotary-to-linear motion ramp 151. The fixed ramp 150 is disposed via the thrust bearing 126 on the other end side of the rotary member 125. The fixed ramp 150 includes a disc-shaped fixed plate 154 and a plurality of projections 155 disposed at circumferential intervals on the outer circumferential surface of the fixed plate 154. The fixed plate 154 has a through-hole 156 at its radial center, through which the pushrod 102 extends. With the projections 155 of the fixed ramp 150 fitted in the respective locking grooves 132 in the retainer 110 and also fitted in the longitudinal grooves 22 for rotation restriction on the inner circumferential surface of the piston 18, the fixed ramp 150 is supported so as not to rotate relative to the piston 18, but to move axially. A plurality of ball grooves 157, three in this embodiment, are formed on the other end surface of the fixed plate 154. The plurality of ball grooves 157 extend in an arc at a certain angle of inclination along the circumferential direction, and have an arc cross section in the radial direction.

The rotary-to-linear motion ramp 151 includes an annular rotary-to-linear motion plate 160 and a cylindrical portion 161 integral with and projecting from a radially central portion of the other end surface of the rotary-to-linear plate 160. A female thread portion 162 that is threadably fitted on the male thread portion 104 of the pushrod 102 on the inner circumferential surface extending from the rotary-to-linear motion plate 160 to the cylindrical portion 161. The rotary-to-linear motion plate 160 has a plurality of ball grooves 163, three in this embodiment, on its surface facing the fixed plate 154 of the fixed ramp 150. The ball grooves 163 extend in an arc at a certain angle of inclination along the circumferential direction, and have an arc cross section in the radial direction. Alternatively, the ball grooves 157 on the fixed ramp 150 and the ball grooves 163 on the rotary-to-linear motion ramp 151 may be formed by making recesses somewhere along the circumferential incline or varying the degree of inclination at some points on the incline.

The balls 152 are interposed between the ball grooves 163 on the rotary-to-linear motion ramp 151 (rotary-to-linear motion plate 160) and the ball grooves 157 on the fixed ramp 150 (fixed plate 154). When rotary torque is applied to the rotary-to-linear motion ramp 151, the balls 152 between the ball grooves 163 on the rotary-to-linear motion plate 160 and the ball grooves 157 on the fixed plate 154 roll, such that a difference in rotation between the rotary-to-linear motion plate 160 and the fixed plate 154 results in a change in axial relative distance between the rotary-to-linear motion plate 160 and the fixed plate 154.

The annular compression plate 129 is disposed via the thrust bearing 129 on the other end surface around the cylindrical portion 161 of the rotary-to-linear motion plate 160. The annular compression plate 129 has a plurality of projections 168 at circumferential intervals on the outer circumferential surface of the annular circumferential plate 129. With the projections 168 of the annular compression plate 129 fitted in the locking grooves 132 in the retainer 110 and also fitted in the longitudinal grooves 22 for rotation restriction on the inner circumferential surface of the piston 18, the annular compression plate 129 is supported so as not to rotate relative to the piston 18, but to move axially.

The rotary-to-linear motion ramp 151 of the ball-and-ramp mechanism 127 is rotatably supported via the thrust bearing 128 on the annular compression plate 129. The other end surface of the annular compression plate 129 comes into contact with the bottom 19 of the piston 18 and presses it. The annular compression plate 129 has receiving recesses 171 at outer circumferential portions of the other end surface thereof between the projections 168. The receiving recesses 171 accommodate the lugs 136 of the retainer 110 folded inward. As shown in FIG. 2, a stopper member 172 is integrally fixed to a tip of the male thread portion 104 of the pushrod 102. The stopper member 172 defines a range of relative rotation between the pushrod 102 and the rotary-to-linear motion ramp 151 of the ball-and-ramp mechanism 127.

As shown in FIG. 1, the motor 200 is connected to an ECU 175 including an electronic controller for controlling actuation of the motor 200. The ECU 175 is connected to a parking switch 176 operated to command apply and release of the parking brake. The ECU 175 can also operate in response to a signal from the vehicle (not shown) side without operation of the parking switch 176.

Operation of the disc brake 1 of this embodiment will now be described.

First, operation of the disc brake 1 when braking as a normal hydraulic brake actuated by the brake pedal (not shown) will be described.

When the driver steps on the brake pedal, hydraulic pressure proportional to the force acting on the brake pedal is supplied from the master cylinder via a hydraulic circuit (both omitted from the drawings) into the hydraulic chamber 21 in the caliper 4. This hydraulic pressure moves the piston 18 forward (to the left in FIG. 1) from its initial non-braking position, while elastically deforming the piston seal 16, so as to press the inner brake pad 2 against the disc rotor D. Reaction force to the pressing force exerted by the piston 18 causes the caliper body 6 to move to the right, as viewed in FIG. 1, relative to the bracket 5, thereby pressing the outer brake pad 3 attached to the claw portion 8 against the disc rotor D. As a result, the disc rotor D is sandwiched between the pair of inner and outer brake pads 2 and 3, generating frictional force, and thus braking force for the vehicle.

When the driver releases the brake pedal, the supply of hydraulic pressure from the master cylinder is interrupted, resulting in a drop in hydraulic pressure in the hydraulic chamber 21. This permits the piston 18 to be retracted to the initial position by restoring force of the piston seal 16 under elastic deformation, thereby releasing the braking force. Incidentally, if the displacement of the piston 18, due to wearing off of the inner and outer brake pads 2 and 3, increases and exceeds the limit of elastic deformation of the piston seal 16, a slide occurs between the piston 18 and the piston seal 16. This slide displaces the initial position of the piston 18 relative to the caliper body 6, adjusting the pad clearance to remain constant.

Next, operation of the disc brake 1, when serving as a parking brake, another example of operation of keeping the vehicle at rest, will be described.

First, when the parking switch 176 is operated to switch from the release state to the apply state of the parking brake, the ECU 175 actuates the motor 200 to rotate the sun gear 57 of the planetary-gear reduction mechanism 45 with the aid of the spur-gear multistage reduction mechanism 44. The rotation of the sun gear 57 rotates the carrier 62 via the planetary gears 60. Then, the rotary torque from the carrier 62 is transmitted to the nut base 75.

Next, rotation-resistant torque exerted by the second spring clutch 124 resisting the rotation of the rotary member 125 (pushrod 102) in the apply direction, relative to the retainer 110 (piston 18), is set larger than rotation-resistant torque exerted by the first thread fitting portion 105 between the pushrod 102 and the base nut 75. This permits rotation of the pushrod 102 in the apply direction by the first spring clutch 100, relative to the base nut 75. As such, the rotation of the base nut 75 in the apply direction gives rise to relative rotation of the first thread fitting portion 105. In other words, only the base nut 75 rotates in the apply direction, and the pushrod 102 axially moves forward toward the bottom 19 of the piston 18.

As a result, the retainer 110 and the constituent members disposed in the retainer 110, namely, the one-end-side washer 120, the coil spring 121, the other-end-side washer 122, the support plate 123, the second spring clutch 124, the rotary member 125, the thrust bearing 126, the ball-and-ramp mechanism 127, the thrust bearing 128, and the annular compression plate 129, together with the pushrod 102, move axially forward as a whole toward the bottom 19 of the piston 18. This forward movement of the constituent members brings the annular compression plate 129 into contact with the bottom 19 of the piston 18, and the piston 18 moves forward so that one end surface of the bottom 19 of the piston 18 comes into contact with the inner brake pad 2.

As the motor 200 keeps on rotating in the apply direction, the piston 18 is caused by the movement of the pushrod 102 to begin to press the brake pads 2 and 3 against the disc rotor D. As this pressing force begins to generate, axial force, which is reaction force to the pressing force, causes the rotation-resistant torque exerted by the first thread fitting portion 105 between the pushrod 102 and the base nut 75 to increase beyond the rotation-resistant torque exerted by the second spring clutch 124. As a result, as the base nut 75 rotates, the pushrod 102 begins to rotate in the apply direction with the rotary member 125. Since the rotation-resistant torque exerted by the second thread fitting portion 106 between the pushrod 102 and the ball-and-ramp mechanism 127 is increased by reaction force to the pressing force on the disc rotor D, the rotational torque of the pushrod 102 in the apply direction is transmitted via the second thread fitting portion 106 to the rotary-to-linear motion ramp 151 of the ball-and-ramp mechanism 127.

While the rotary-to-linear motion ramp 151 of the ball-and-ramp mechanism 127 rotates in the apply direction, the balls 152, which are rolling, cause the rotary-to-linear motion ramp 151 and the fixed ramp 150 to overcome the urging force of the coil spring 121 and separate from each other, such that the annular compression plate 129 further presses the bottom 19 of the piston 18. This increases the pressing force exerted by the inner and outer brake pads 2 and 3 on the disc rotor D.

In this disc brake 1 of the this embodiment, the first thread fitting portion 105 between the pushrod 102 and the base nut 72 first undergoes relative rotation to move the pushrod 102 forward, which in turn moves the piston 18 forward to provide the pressing force on the disc rotor D. As such, the first thread fitting portion 105 acts to adjust the initial position of the pushrod 102 relative to the piston 18, which position changes as the inner and outer brake pads 2 and 3 wear off over time.

Then, the ECU 175 drives the motor 200 until the pressing force of the pair of the inner and outer brake pads 2 and 3 acting on the disc rotor D reaches a preset value, e.g., until the electric current to the motor 200 reaches a preset value. Upon determining that the current to the motor 200 has reached the present value, i.e., that the pressing force on the disc rotor D has reached the preset value, the ECU 175 cuts off the supply of current to the motor 200. This terminates linear motion resulting from rotation of the rotary-to-linear motion ramp 151 of the ball-and-ramp mechanism 127.

Although the reaction force to the pressing force on the disc rotor D eventually acts on the rotary-to-linear motion ramp 151, the second thread fitting portion 106 between the pushrod 102 and the ball-and-ramp mechanism 127 is configured to avoid counteractions therebetween, and the first thread fitting portion 105 between the pushrod 102 and the base nut 75 is likewise configured to avoid counteractions therebetween; further, the rotation-resistant torque in the release direction, relative to the base nut 75, is applied by the first spring clutch 100 to the pushrod 102. This keeps the piston 18 in its braking position. As a result, the braking force is kept up to the end of operation of the parking brake.

When releasing the parking brake, the ECU 175 actuates the motor 200 to rotate the piston 18in the release direction causing the piston 18 to be spaced apart from the disc rotor D, based on operation of the parking switch 176 for parking brake release. This causes the spur-gear multistage reduction mechanism 44 and the planetary-gear reduction mechanism 45 to rotate in the release direction retracting the piston 18. This rotation in the release direction is transmitted via the carrier 62 to the base nut 75.

At this stage, the pushrod 102 is subject to the reaction force to the pressing force on the disc rotor D. In other words, the pushrod 102 is acted upon by the rotation-resistant torque exerted by the second thread fitting portion 106 between the pushrod 102 and the ball-and-ramp mechanism 127, the rotation-resistant torque exerted by the first thread fitting portion 105 between the pushrod 102 and the base nut 75, and the rotation-resistant torque exerted by the first spring clutch 100 resisting the rotation of the pushrod 102 in the release direction relative to the base nut 75. As such, the rotary torque in the release direction exerted by the base nut 75 is transmitted to the pushrod 102 (including the rotary member 125) and the rotary-to-linear motion ramp 151 of the ball-and-ramp mechanism 127. As a result, the rotary-to-linear motion ramp 151 undergoes only rotation in the release direction back to its initial position in the rotational direction.

Then, the reaction force to the pushrod 102 decreases, and the rotation-resistant torque exerted by the second thread fitting portion 106 between the pushrod 102 and the ball-and-ramp mechanism 127 drops below the sum of the rotation-resistant torque exerted by the first spring clutch 100 resisting the rotation of the pushrod 102 in the release direction relative to the base nut 75 and the rotation-resistant torque of the first thread fitting portion 105 between the pushrod 102 and the base nut 75. This causes only the second thread fitting portion 106 to undergo relative rotation so that the rotary-to-linear motion ramp 151 of the ball-and-ramp mechanism 127 axially moves with the retainer 110 toward the bottom wall 11 of the cylinder 15 (in the release direction) and reverts to its initial axial position.

As the motor 200 further rotates in the release direction to keep up the rotation of the base nut 75 in the release direction, the rotary-to-linear motion ramp 151 of the ball-and-ramp mechanism 127 returns to both its initial rotational and axial positions, and subsequently the threadably-fitting position of the second thread fitting portion 106 between the pushrod 102 and the ball-and-ramp mechanism 127 returns to its initial position, such that the rotation of the pushrod 102 in the release direction comes to an end. As the rotation of the base nut 75 in the release direction goes on, the pushrod 102 overcomes the rotation-resistant torque exerted by the first spring clutch 100 resisting the rotation of the pushrod 102 in the release direction relative to the base nut 75 and moves back axially toward the bottom wall 11 of the cylinder 15 (in the release direction). As a result, the retainer 110 and the constituent members disposed in the retainer 110, namely, the one-end-side washer 120, the coil spring 121, the other-end-side washer 122, the support plate 123, the second spring clutch 124, the rotary member 125, the thrust bearing 126, the ball-and-ramp mechanism 127, the thrust bearing 128, and the annular compression plate 129, together with the pushrod 102, move axially backward as a whole toward the bottom wall 11 of the cylinder 15 (in the release direction). Owing to restoring force of the piston seal 16 under elastic deformation, the piston 18 then comes back to its initial position, fully releasing the braking force.

When the disc brake 1 serves, for example, as the parking brake as described above, radial and axial vibrations coming from the spur-gear multistage reduction mechanism 44 and the planetary-gear reduction mechanism 45 are taken up by the rubber 230. In particular, the first cylindrical portion 231B of the first cup portion 231 of the rubber 230 is fitted in the first holder-side projection 211 of the holder 205, and the first cylindrical portion 231B, including the first protrusion 231C of the first cup portion 231 of the rubber 230, is fitted in the first cylindrical portion 231B of the cover 36; as a result, the vibrations from the spur-gear multistage reduction mechanism 44 and the planetary-gear reduction mechanism 45 do not excessively act on the rubber 230 in such a direction as to shear it. As such, the rubber 230 is protected from shear fracture.

As described above, the disc brake 1 of this embodiment is so arranged that: the first cylindrical portion 231B of the first cup portion 231 of the rubber 230 is fitted on the first holder-side projection 211 of the holder 205; the second cylindrical portion 232B of the second cup portion 232 of the rubber 230 on the second holder-side projection 212 of the holder 205; and the third cylindrical portion 233B of the third cup portion 233 of the rubber 230 on the third holder-side projection 213 of the holder 205; and also the first cylindrical portion 231B, including the first protrusion 231C of the first cup portion 231 of the rubber 230, is fitted in the first cylindrical portion 231B of the cover 36; the second protrusion 232C of the second cup portion 232 of the rubber 230 is in contact with the second cover-side projection 222 of the cover 36; and the third protrusion 233C of the third cup portion 233 of the rubber 230 in contact with the third cover-side projection 223 of the cover 36. This arrangement enables the rubber 230 to take up the radial and axial vibrations coming from the spur-gear multistage reduction mechanism 44 and the planetary-gear reduction mechanism 45. Also, the vibrations from the spur-gear multistage reduction mechanism 44 and the planetary-gear reduction mechanism 45 do not excessively act on the rubber 230 in such a direction as to shear it. As such, the rubber 230 is protected from shear fracture.

In the disc brake 1 of this embodiment, the rubber 230 is unitized with the holder 205 in such a manner that the first cylindrical portion 231B of the first cup portion 231 of the rubber 230 is fitted on the first holder-side projection 211 of the holder 205, the second cylindrical portion 232B of the second cup portion 232 of the rubber 230 on the second holder-side projection 212 of the holder 205, and the third cylindrical portion 233B of the third cup portion 233 of the rubber 230 on the third holder-side projection 213 of the holder 205. This facilitates handling of the disc brake 1, for example during assembly.

This embodiment uses as an elastic member the rubber 230 formed by integrating the first to third cup portion s 231 to 233. The rubber 230, however, is not limited to such an elastic member. Instead, the cup portions may be separate elastic members. In particular, only the first cup portion 231 may be formed as an elastic member. Alternatively, two of the three cup portions may be combined to form an integral rubber to serve as an elastic member.

Having described several embodiments of the present invention, the above-described embodiments of the invention are intended to facilitate understanding of the present invention, and are not intended to limit the present invention. Needless to say, the present invention can be modified or improved without departing from the scope and the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority to Japanese Patent Application No. 2014-264772, filed on Dec. 26, 2014. The content of the entire disclosure in Japanese Patent Application No. 2014-264772, filed on Dec. 26, 2014, including the specification, the claims, the drawings, and the abstract, is incorporated herein by reference in its entirety.

REFERENCE NUMERALS 1. disc brake
30. housing
36. cover
44. spur-gear multistage reduction mechanism (reduction mechanism)
45. planetary-gear reduction mechanism (reduction mechanism)
200. motor
201. rotary shaft
205. holder
206. motor support
207. ring-like support
211. first holder-side projection
212. second holder-side projection
213. third holder-side projection
221. first cover-side cylindrical portion (first recess)
222. second cover-side cylindrical portion
223. third cover-side cylindrical portion
230. rubber (elastic member)
231. first cup portion
232. second cup portion
233. third cup portion

The invention claimed is:

1. A disc brake comprising:
a housing;
a motor configured to receive supply of electric current to generate rotary motion, the motor having a rotary shaft;
a reduction mechanism accommodated in the housing and configured to utilize rotary motion generated by the motor to generate amplified force;
a cover disposed to cover an opening in an end of the housing;
a holder disposed in the housing and directly supporting the motor and the reduction mechanism; and
at least three connecting portions each connecting the holder and the cover, wherein each of the connecting portions includes:
a cylindrical projection formed on the holder and projecting along the rotary shaft of the motor,
a cylindrical recess formed in the cover to provide a recess along the rotary shaft of the motor, and
a cup-shaped elastic member disposed between the cylindrical projection and the cylindrical recess,
wherein the elastic member covers all surfaces of the cylindrical projection that oppose interior surfaces of the cylindrical recess, and
wherein the connecting portions are disposed around the rotary shaft of the motor.

2. The disc brake according to claim 1, wherein the connecting portions are disposed close to the rotary shaft of the motor.

3. The disc brake according to claim 1, wherein the elastic member is unitized with the holder.

4. The disc brake according to claim 2, wherein the elastic member is unitized with the holder.

5. A disc brake comprising:
a housing;
a motor configured to receive a supply of electric current to generate rotary motion;
a reduction mechanism accommodated in the housing and configured to utilize rotary motion generated by the motor to generate amplified force;
a cover disposed to cover an opening in an end of the housing; and
a holder disposed in the housing and supporting the motor and the reduction mechanism;
wherein the holder includes:
a plurality of projections received in recesses formed in the cover;
cup-shaped elastic members disposed between the projections and interior surfaces of the recesses, respectively; and
a ring-like support disposed around an internal gear of the reduction mechanism, the ring-like support surrounding the internal gear.

6. The disc brake according to claim 5, wherein the holder is integrally formed.

* * * * *